United States Patent
Damgaard

(10) Patent No.: US 6,899,458 B2
(45) Date of Patent: May 31, 2005

(54) SUBJECT TABLE FOR A MAMMOGRAPHY APPARATUS

(75) Inventor: Jörgen Bjerg Damgaard, Tranbjerg (SE)

(73) Assignee: Siemens Aktiengesellschaft, Münich (DE)

( * ) Notice: Subject to any disclaimer, the term of this patent is extended or adjusted under 35 U.S.C. 154(b) by 109 days.

(21) Appl. No.: 10/298,082

(22) Filed: Nov. 15, 2002

(65) Prior Publication Data

US 2003/0093861 A1 May 22, 2003

(30) Foreign Application Priority Data

Nov. 22, 2001 (SE) .............................................. 0103888

(51) Int. Cl.⁷ .............................................. G03B 42/02
(52) U.S. Cl. ........................ 378/181; 378/167; 378/37
(58) Field of Search ................ 378/209, 167, 378/172–175, 181, 182, 37

(56) References Cited

U.S. PATENT DOCUMENTS

| | | | |
|---|---|---|---|
| 3,826,922 A | | 7/1974 | Ingles |
| 3,968,375 A | * | 7/1976 | Peyser et al. ............... 378/181 |
| 5,148,466 A | * | 9/1992 | Fajac ......................... 378/167 |
| 6,276,827 B1 | | 8/2001 | Nakamura et al. |
| 6,816,569 B2 | * | 11/2004 | Andreasson et al. .......... 378/37 |

FOREIGN PATENT DOCUMENTS

WO  WO 01/38938  5/2001

OTHER PUBLICATIONS

Patent Abstracts of Japan Publication No. 58057127, for Japanese Application 56156591.
Siemens–Elema Brochure for MAMMOMAT 3000 Nova.

* cited by examiner

*Primary Examiner*—Edward J. Glick
*Assistant Examiner*—Chih-Cheng Glen Kao
(74) *Attorney, Agent, or Firm*—Schiff Hardin LLP

(57) ABSTRACT

A subject table for a mammography apparatus has a slot for an X-ray film cassette extending therethrough, as well as a locking mechanism for the cassette arranged in the slot. The locking mechanism has a spring-loaded arm carrying a first detent, and a second detent, at least one of the detents being spring-loaded such that the detents lie tightly against the narrow sides of the cassette when a cassette is introduced into the slot. For simplified removal or replacement of a cassette, the arm is displaceable in its longitudinal direction, and the second detent is displaceable perpendicularly to the longitudinal direction of the arm. When the second detent is removed from the cassette by an operating manipulation, the spring loading of the first detent causes the cassette to be ejected from the slot to a sufficient extent to allow it to be grasped by the operator.

2 Claims, 2 Drawing Sheets

SUBJECT TABLE FOR A MAMMOGRAPHY APPARATUS

BACKGROUND OF THE INVENTION

1. Field of the Invention

The present invention is directed to a subject table for a mammography apparatus of the type having a slot for an X-ray film cassette as well as a locking mechanism for the cassette arranged in the slot that has first and second detents, at least one of the detents being spring-loaded such that the detents lie tightly against the narrow sides of the cassette when a cassette is introduced into the tunnel.

2. Description of the Prior Art

A subject table having a locking mechanism of this type is shown in the brochure of Siemens AG entitled "Because she deserves the very best MAMMOMAT 3000 Nova". The locking mechanism therein is an arcuately curved leaf spring that is secured in one of the slot walls with the aforementioned detent disposed at an end thereof. When a cassette held in the slot is released or when replacing a cassette, the operator pushes one of the detents in the direction of the slot wall with one hand, so that the detent is moved away from the narrow side of the cassette. At the same time, the operator pushes the cassette out of the slot by pressing the other narrow side of the cassette into the slot with his/her other hand. A release or replacement of a cassette can ensue only with the use of both hands.

SUMMARY OF THE INVENTION

An object of present invention is to provide a subject table of the type initially described having a lock mechanism allowing a release or a replacement of a cassette to be implemented in a simple way with the use of only one hand.

This object is inventively achieved in a subject table of the type initially described wherein the lock mechanism has at least one arm that is spring-loaded in its longitudinal direction, with one end is provided with the first detent, and wherein the arm is displaceable in its longitudinal direction, and wherein the second detent is arranged to be displaceable perpendicularly to the longitudinal direction of the arm. When releasing a cassette that is clamped in a lock mechanism, the operator pushes the second detent perpendicularly to the longitudinal direction of the arm with one finger of one hand, so that the first detent is moved away from the narrow side of the cassette. The first detent of the arm is spring-loaded by a cassette inserted into the slot, so that it now automatically pushes the cassette out of the slot to such an extent that the operator can grasp it.

In an embodiment of the lock mechanism of the invention the lock mechanism has a second arm that is also spring-loaded in its longitudinal direction to which the second detent is attached. As a result of this structure of the lock mechanism, the detents of the highly spring-loaded arms are pressed against both narrow sides of the cassette when a cassette is introduced between the detents. When removing the cassette, the operator can then select from which of the slot openings the cassette should be removed. This ensues by the appropriate detent being removed with one hand from that narrow side of the cassette that the operator wants to eject first, and the spring-loaded detent that presses against the other narrow side of the cassette automatically pushes the cassette out.

In another embodiment of the invention, a comparatively sophisticated structure of the lock mechanism is established in that the arms lie in axial alignment with one another, their free ends being rotatably connected to respective, rotatable gearwheels via respective pins. The pins are eccentrically arranged at the gearwheels, and the gearwheels are arranged in the same plane and mesh with one another, and so the arms are tensional in their longitudinal directions with springs. Again, the operator can select, using only one hand, from which slot opening a cassette inserted into the subject table should be automatically pushed out.

The lock mechanism of the invention preferably is attached to the base of the slot and is disposed therein, so that only the detents project above the surface of the base. It is thus simple to push a cassette into the slot of the subject table.

DESCRIPTION OF THE PREFERRED EMBODIMENTS

Figure 1:
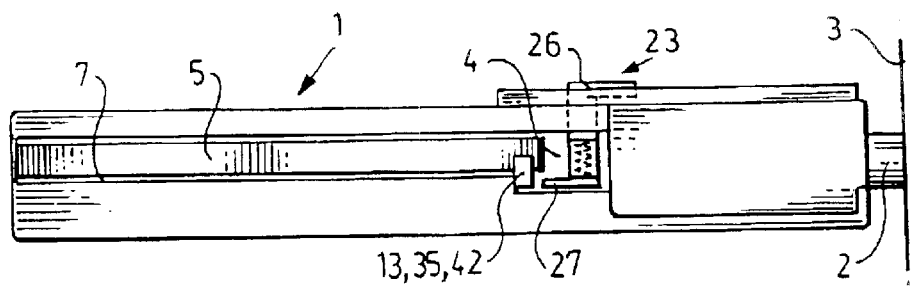
FIG. 1 is a side view of a subject table with a part of the lock mechanism of the invention.

FIG. 1 shows a side view of a subject table 1 that is secured via a shaft 2 to an arm 3 for an X-ray tube (not shown here). The subject table 1 is provided with a slot extending completely through the slot 4, into which an X-ray film cassette 5 can be introduced. FIG. 1 also shows one of two blocking devices 23 (to be described in greater detail later) for a lock mechanism (to be described in greater detail below) for the cassette 5, whereby the lock mechanism is arranged at the base 7 of the slot 4. The second dent 13 of the lock mechanism also is shown in FIG. 1 (at a positioned occupied by second detents 35 and 42 in the respective further embodiments).

Figure 2:
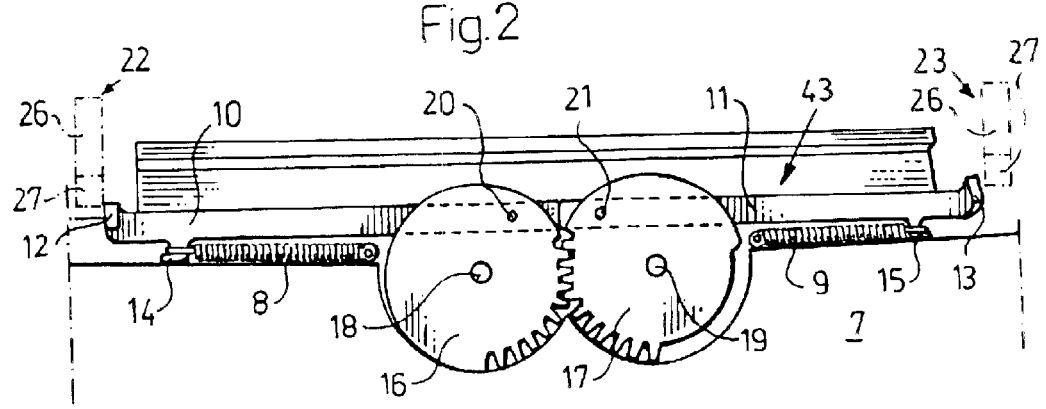
FIG. 2 is a plan view of a lock mechanism of the invention in the parked position.

FIG. 2 shows a plan view of a lock mechanism 43 for a cassette 5. As described above, the lock mechanism 43 is attached to the base 7 of the slot 4. The lock mechanism 43, which is shown in FIG. 2 in a parked position, has two arms 10, 11 arranged in axial alignment with one another and loaded their longitudinal direction by respective springs 8, 9. The outer ends of the arms 10, 11 are provided with respective detents 12, 13. One end of the spring 8 is connected to the arm 10 via a hook 14 projecting therefrom, and the other end of the spring 8 is connected to the base 7. One end of the spring 9 is connected to the arm 11 via a hook 15 projecting therefrom, and the other end of the spring 9 is connected to the base 7. The inner ends of the arms 10, 11 are rotatably connected via respective shaft pins 20, 21 to respective gearwheels 16, 17 rotatable around respective shafts 18, 19. The pins 20, 21 of the arms 10, 11 are eccentrically arranged at the gearwheels 16, 17. The gearwheels 16, 17 are arranged in the same plane and mesh with one another. The lock mechanism 43 is contained within the base 7 of the slot 4, so that only the detents 12, 13 project above the surface of the base 7.

Figure 5:
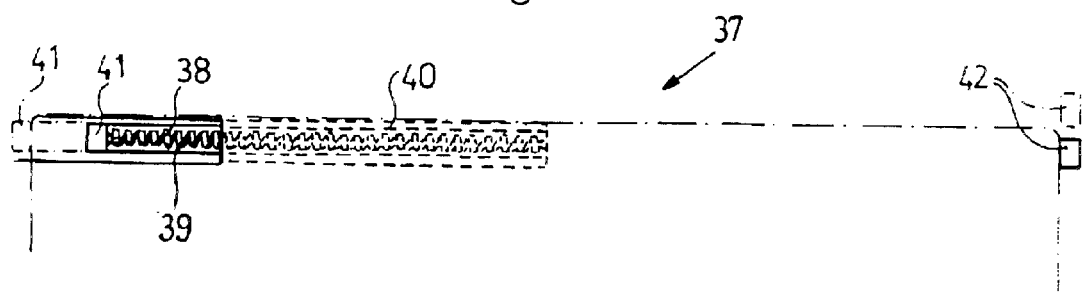
FIG. 5 is a plan view of another embodiment of a lock mechanism of the invention.

Insertion of a cassette 5 into the subject table 1 can ensue from either opening at the opposite ends of the slot 4. Upon insertion of the cassette 5 from the side that is the right side in the plane of the drawing, the detent 13 is pushed aside, so that the cassette 5 can be pushed into the slot 4. The arm 11 is thus rotated around the pin 21. Blocking devices 22, 23 (described later) that prevent such a motion of the arms 10, 11 when a cassette 5 is disposed in the slot 4, allows such a motion when the lock mechanism 43 is in the parked position. The cassette 5 is first pushed into the slot 4 until one narrow side 24 thereof reaches the detent 12 of the arm 10. When the cassette 5 is manually introduced farther into the slot 4, the arm 10 is displaced in its longitudinal direction. Simultaneously therewith the arm 10, by its engagement with the gearwheel 16 via the pin 20 rotates the gearwheel 16 in a counter-clockwise direction, causing the spring 8 to be tensioned. At the same time, the gearwheel 17 is rotated to exactly the same extent, but clockwise. Thus the arm 11 and the detent 13 (since the arm 11 engages the gearwheel 17 via the shaft 21) is displaced in its longitudinal direction to exactly the same extent a the arm 10, so the spring 9 of the arm 11 also is tensioned. When the distance between the detents 12 and 13 is large enough, the cassette 5 is placed such that the detent 12 lies resiliently against one narrow side 24 of the cassette 5 and the detent 13 lies resiliently against the other narrow side 25 of the cassette 5. This is shown in FIG. 5.

Upon introduction of the cassette 5 from the side that is the left side in the plane of the drawing, the detent 12 is displaced such that the cassette 5 can be pushed into the slot 4. The sequence that has already been described then ensues mirror-inverted.

Figure 3:
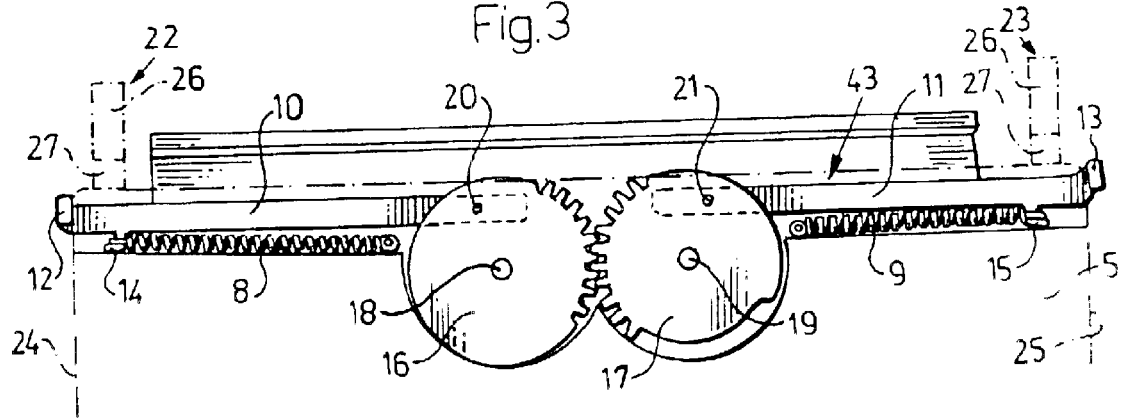
FIG. 3 is a plan view of a lock mechanism of FIG. 2 in the active position.

Given a cassette 5 introduced in the subject table 1, the blocking device 22, 23 (as shown in FIG. 3) respectively block the detents 12, 13 of the arms 10, 11, so that they cannot be rotated around their shafts 20, 21. Each blocking device 22, 23 that is shown in FIG. 1 is composed of a spring-loaded pushbutton 26 having a free end provided with a tongue 27 that lies against the arms 10, 11 when a cassette 5 has been introduced in the subject table 1.

When the cassette 5 is to be released or replaced such that the cassette 5 is pushed out from the right side in the plane of the drawing, the button 26 of the blocking device 23 is pressed down with a finger, so that the tongue 27 comes to lie under the arm 11. At the same time, the detent 13 is displaced with another finger, i.e. the arm 11 is rotated around the pin 21, so that the detent 13 is removed from the narrow side 25 of the cassette 5. In this position of the detent 13, the detent 12 pushes the cassette 5 from the slot 4 with the spring-loaded arm 10 to such an extent that the operator can grasp the cassette 5.

When the operator wants to eject the cassette 5 from the left side in the plane of the drawing, the button for the blocking device 22 is pressed. Subsequently, the detent 12 is removed from the narrow side 24 of the cassette 5 is the described way, and the detent 13 of the spring-loaded arm 11 pushes the cassette 5 out to such an extent that the operator can grasp it.

Figure 4:
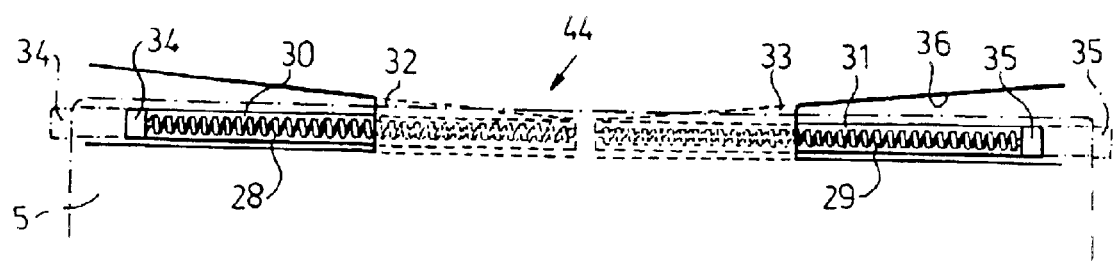
FIG. 4 is a plan view of a further embodiment of a lock mechanism of the invention.

FIG. 4 shows a simplified embodiment of a lock mechanism 44 of the invention. Here, the lock mechanism has two arms 30, 31 arranged in axial alignment with one another and loaded by springs 28, 29. The arms 30, 31 are disposed in the base 7 of the slot 4 and in respective cavities 32, 33. The cavities 32, 33 are provided for stabilizing the movements of the arms 30, 31. FIG. 4 shows that each cavity 32, 33 is wedge-shaped, so that the outer ends of the arms 30, 31 are partly laterally displaceable. The outer ends of the arms 30, 31 are provided with detents 34, 35 that project up above the surface of the base 7. When loading a cassette 5, for example, the detent 35 and thus the arm 31 as well, is pushed against one edge 36 of the cavity 33, so the cassette 5 can now be introduced into the slot 4 of the subject table 1. The cassette 5 is pushed in so far that one narrow side thereof reaches the detent 34 of the arm 30, and so that the other narrow side of the cassette 5 comes to lie against the detent 35 of the arm 31. The force of the spring 28 of the arm 30 is then partly transmitted to the arm 31, and the detents 34, 35 lie against the narrow sides of the cassette 5 with equally distributed spring power when a cassette 5 has been introduced. Dot-dash contours of the detents 34, 35 in FIG. 4 indicate their positions when a cassette 5 has been inserted and held. The operator can then select the slot opening from which the cassette 5 should be ejected, by causing one of the detents 34, 35 to be removed from the cassette 5, as described in conjunction with FIGS. 1 and 2.

FIG. 5 shows an extremely simple embodiment of a lock mechanism 37 of the invention. This lock mechanism 37 has only one arm 39 tensioned with a spring 38 and having a detent 41, whereby the arm 39 and the spring 38 are let into the floor 7 of the tunnel. A part of the arm 39 is arranged in a cavity 40 in order to stabilize the arm 39. The lock mechanism 37 also has a second detent 42 that is displaceable perpendicular to the longitudinal direction of the arm 39. When a cassette 5 is loaded, the detent 42 is brought into a position that is indicated with dot-dash contours of the detent 42. The cassette 5 can now be pushed into the slot 4 for the subject table 1 (FIG. 1) and, as in conjunction with exemplary embodiments that have already been described, pushes the arm 39 until the cassette 5 has reached a position between the detent 41 and the detent 42 (which has now sprung back) to engage a narrow side of the cassette 5. Given a lock mechanism of this type, the cassette 5 can be pushed out from only one slot opening. When the detent 42 is removed from the cassette 5, the spring power of the detent 41 pushes the cassette 5 from that slot opening at which the detent 42 is located.

Although modifications and changes may be suggested by those skilled in the art, it is the intention of the inventor to embody within the patent warranted hereon all changes and modifications as reasonably and properly come within the scope of his contribution to the art.

I claim as my invention:

1. A subject table for a mammography apparatus, comprising:

a table body having a slot extending completely therethrough and adapted to receive an X-ray film cassette;

a locking mechanism disposed in said slot and adapted to interact with an X-ray film cassette in said slot;

said locking mechanism comprising a first detent and a second detent, at least one of said first and second detents being spring-loaded to urge said first and second detents tightly against narrow sides of an X-ray film cassette in said slot, and a first arm spring-loaded in a longitudinal direction of said first arm and having an end carrying said first detent, said first arm being displaceable along said longitudinal direction of said first arm, and said second detent being displaceable perpendicularly to said longitudinal direction of said first arm, and a second arm, spring-loaded in a longitudinal direction of said second arm, to which said second detent is attached, said first and second arms being axially aligned, and said first arm having a free end opposite the end at which said first detent is carried and said second arm having a free end opposite said end at which said second detent is carried; and a first gear wheel rotatable around a first shaft and a second gear wheel rotatable around a second shaft, said first and second gear wheels being disposed in a common plane and meshing with each other, said first gear wheel rotatably and eccentrically engaging said free end of said first arm and said second gear wheel rotatably engaging said free end of said second arm to respectively spring-tension said first and second arms along said respective longitudinal directions.

2. A subject table as claimed in claim 1 wherein said slot has a bottom, and wherein said locking mechanism is disposed below said bottom of said slot with only said detents projecting above said bottom of said slot.

* * * * *